(12) United States Patent
Thornley et al.

(10) Patent No.: US 7,865,773 B2
(45) Date of Patent: Jan. 4, 2011

(54) SYSTEM, METHOD, AND DEVICE INCLUDING BUILT-IN SELF TESTS FOR COMMUNICATION BUS DEVICE

(75) Inventors: Bryan J. Thornley, Georgetown, TX (US); Craig Chaiken, Pflugerville, TX (US); Vinod Makhija, Austin, TX (US); Andrew O'Rourke, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 12/549,221

(22) Filed: Aug. 27, 2009

(65) Prior Publication Data

US 2009/0319828 A1 Dec. 24, 2009

Related U.S. Application Data

(63) Continuation of application No. 11/612,823, filed on Dec. 19, 2006, now Pat. No. 7,600,156.

(51) Int. Cl.
*G06F 11/00* (2006.01)
(52) U.S. Cl. ...................................................... 714/30
(58) Field of Classification Search ............. 714/25–27, 714/30–32, 37–39, 43–54, 56
See application file for complete search history.

(56) References Cited

U.S. PATENT DOCUMENTS

| | | | | |
|---|---|---|---|---|
| 5,537,663 A | * | 7/1996 | Belmont et al. | 710/17 |
| 5,617,430 A | | 4/1997 | Angelotti et al. | |
| 5,748,980 A | * | 5/1998 | Lipe et al. | 710/8 |
| 5,999,989 A | * | 12/1999 | Patel | 710/1 |
| 6,467,054 B1 | | 10/2002 | Lenny | |
| 6,904,389 B2 | * | 6/2005 | Hornberger et al. | 702/188 |
| 6,954,712 B2 | | 10/2005 | Bingham et al. | |
| 7,080,789 B2 | * | 7/2006 | Leaming | 235/492 |
| 7,162,554 B1 | | 1/2007 | Cole et al. | |
| 7,600,156 B2 | * | 10/2009 | Thornley et al. | 714/43 |
| 2004/0123013 A1 | * | 6/2004 | Clayton et al. | 710/310 |
| 2004/0158787 A1 | | 8/2004 | Zayas et al. | |
| 2004/0222305 A1 | * | 11/2004 | Leaming | 235/492 |
| 2005/0240711 A1 | | 10/2005 | Watanabe | |
| 2007/0226733 A1 | | 9/2007 | Bendixen et al. | |
| 2008/0126390 A1 | * | 5/2008 | Day et al. | 707/102 |

* cited by examiner

*Primary Examiner*—Nadeem Iqbal
(74) *Attorney, Agent, or Firm*—Larson Newman & Abel, LLP

(57) ABSTRACT

A method, device, and system including built-in self tests for a communication bus device is disclosed. In one form, a method of testing a device operable to be coupled to a communication port an information handling system includes accessing a configuration descriptor of a first device operable to be coupled to a communication bus of an information handling system. The method can also include detecting a self-test descriptor associated with the configuration descriptor and testing a portion of the first device using test information associated with the self-test descriptor. The device and system can include logic to perform the methods described herein.

19 Claims, 3 Drawing Sheets

SYSTEM, METHOD, AND DEVICE INCLUDING BUILT-IN SELF TESTS FOR COMMUNICATION BUS DEVICE

CROSS-REFERENCE TO RELATED APPLICATION(S)

This application is a continuation of prior U.S. patent application Ser. No. 11/612,823, entitled "System, Method, and Device Including Built-In Self Tests for Communication Bus Device," invented by Bryan J. Thornley et al., filed on Dec. 19, 2006, and assigned to the assignee hereof.

FIELD OF THE DISCLOSURE

This disclosure relates generally to information handling systems, and more particularly, to a system, method, and device including built-in self tests for a communication bus device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Communication between information handling systems and various internal and external components has expanded to include various different types of communication mediums and associated communication protocols. For example, serial and parallel communication buses, such as Universal Serial Buses (USBs), a Peripheral Component Interconnect (PCI) buses, PCI Express buses, etc. can be used to connect peripheral devices or components using a specific communication protocol based on the type of bus employed.

Communication over some buses can be established using firmware, such as drivers or application program interfaces (APIs) that is usually transparent to end users. Various standards have been established to develop drivers or APIs to facilitate allowing third party devices and components to comply with communication standards. For example, standard protocols for specific bus architectures are used when such devices are connected to information handling systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
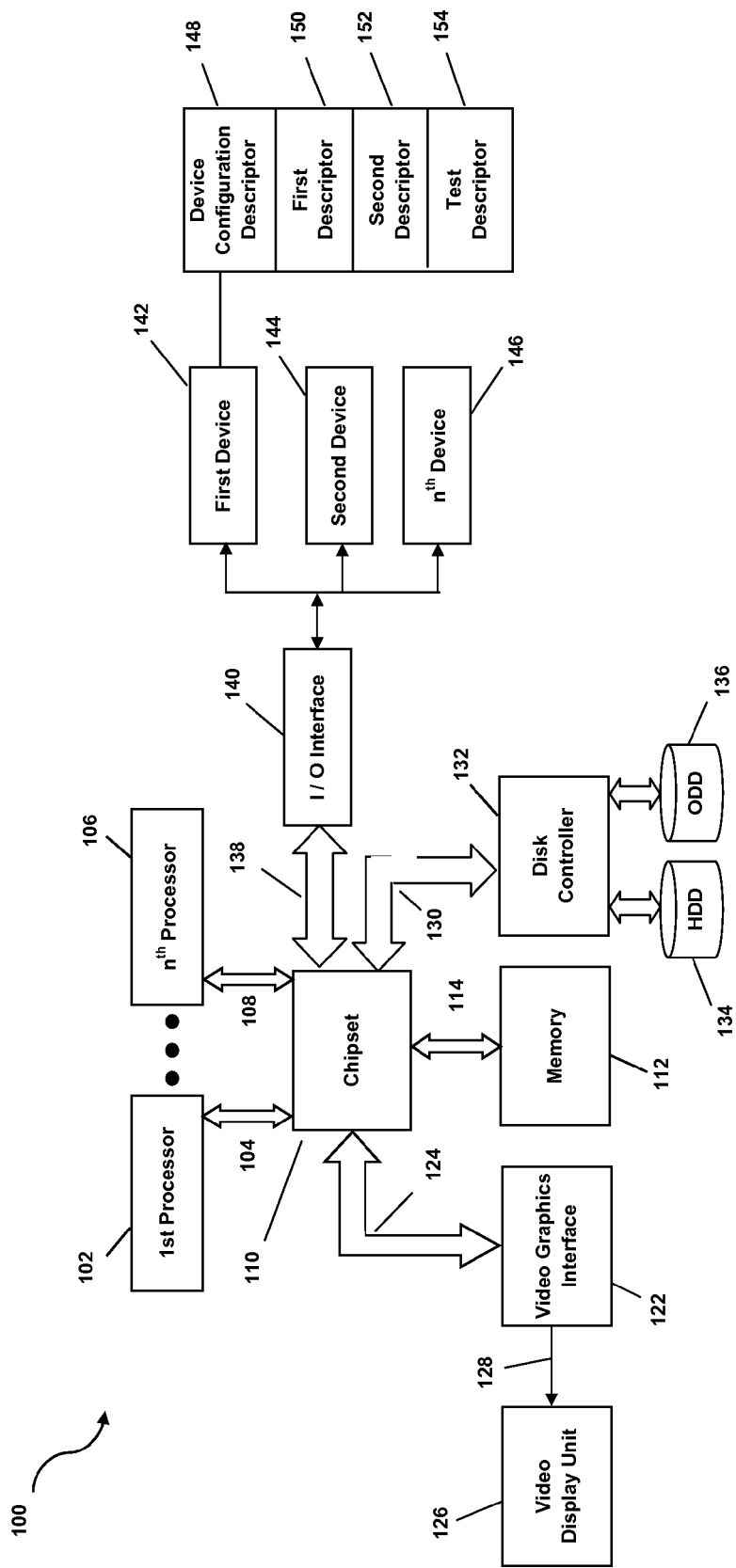
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on information handling systems having printed circuit boards with quality verification test structures and methods for testing test structures. However, other teachings may certainly be utilized in this application. The teachings may also be utilized in other applications and with several different types of architectures such as distributed computing architectures, client/server architectures, or middleware server architectures and associated components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and may vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect, a device can include a communication interface operable to be coupled to a communication bus of an information handling system. The device can further include a configuration descriptor stored within a memory operable to be accessed during a communication bus scan. The device can also include a self-test descriptor associated with the configuration descriptor. The self-test descriptor is operable to be read in association with the configuration descriptor.

According to a particular aspect, a method of testing an electronic device includes accessing a configuration descriptor of a first device operable to be coupled to a communication bus of an information handling system. The method can also include detecting a self-test descriptor associated with the configuration descriptor and testing a portion of the first device using test information associated with the self-test descriptor.

According to a further aspect of the disclosure, an information handling system includes a communication bus operable to couple a bus-enabled device. The information handling system can further include a processor operable to initiate a scan of the communication bus to read a configuration descriptor of the bus-enabled device. The information handling system can also include a test mode output operable to be coupled to the bus-enabled device in response to detecting a self-test descriptor within the configuration descriptor.

FIG. 1 illustrates a block diagram of an exemplary embodiment of an information handling system, generally designated at 100. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and allows for simultaneous processing of multiple processes and supports the exchange of information within information handling system 100 during multiple processing operations.

According to one aspect, the chipset 110 can be referred to as a memory hub or a memory controller. For example, the chipset 110 the can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an input/output (I/O) controller hub. As a memory controller hub, the chipset 110 can function to access the first physical processor 102 using the first bus 104 and the nth physical processor 106 using the second host bus 108. The chipset 110 can also be used as a memory interface for accessing the memory 112 using a third host bus 114. In a particular embodiment, the host buses 104, 108, and 114 can be individual buses or part of the same bus. The chipset 110 can also bus used as bus control and can handle transfers between the host buses 104, 108, 114.

According to one aspect, the chipset 110 can include an application specific chipset that can connect to various buses, and integrates other system functions. For example, the chipset 110 can be an Intel® Hub Architecture (IHA) chipset also that can include two parts, a Graphics and AGP Memory Controller Hub (GMCH) and an I/O Controller Hub (ICH). For example, an Intel 820E, an Intel 815E chipset, available from the Intel Corporation of Santa Clara, Calif., or combinations thereof, that can include at least a portion of the chipset 110. The chipset 110 can also be packaged as an application specific integrated circuit (ASIC).

In one form, the chipset 110 can be coupled to a video graphics interface 122 using a fourth host bus 124. A video graphics interface 122 can be provided as an Accelerated Graphics Port (AGP) interface operable to display content within a video display unit 126. The video graphics interface 122 can output a video display content output 128 to the video display unit 126. The video display unit 126 can include one or more types of video displays such as a flat panel displays (FPDs); Cathode Ray Tube displays (CRTs) or other type of display devices.

In an alternate embodiment, the chipset 110 can be used as a chipset employing a Northbridge/Southbridge chipset configuration (not illustrated). For example, a Northbridge portion of the chipset 110 can communicate with the first physical processor 102, and can control interaction with the memory 112. The Northbridge portion can also control interaction with the fourth host bus 124 operable as a PCI bus, and activities for the video graphics interface 122. The Northbridge portion can also communicate with the first physical processor 102 using the first bus 104, and the second bus 108 coupled to the $n^{th}$ physical processor 106. The chipset 110 can also include a Southbridge portion (not illustrated) of the chipset 110 and can handle I/O functions of the chipset 110. The Southbridge portion can be coupled to the I/O interface 140 and can manage the basic forms of input/output (I/O) such as Universal Serial Bus (USB) I/O, serial I/O, audio outputs, Integrated Drive Electronics (IDE) I/O, and Industry Standard Architecture (ISA) I/O for the information handling system 100. According to one aspect, the information handling system 100 can include the I/O interface 140 operably coupled to the chipset 110 using an I/O bus 138. In one form, the I/O interface 140 can include serial buses, parallel buses, or any combination thereof and can be provided as an industry standard bus or a proprietary bus.

According to another aspect, the information handling system 100 can also include a component bus 130 operably coupled to a disk controller 132. The component bus 130 can be operable to connect one or more devices or components using a universal serial bus (USB) or other industry standard buses or proprietary buses, such as ISA, SCSI, I2C, SPI, or PCI buses, or any combination thereof, can be also provided in association with, or independent of, the component bus 130. In one form, the component bus 130 can connect to the disk controller 132 operable to connect one or more disk drives such as a hard disk drive (HDD) 134, an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of drive.

According to one aspect, the I/O bus 138 can be coupled to the I/O interface 140 operable to couple one or more devices using one or more communication ports associated with the I/O Interface 140. For example, the I/O interface 140 can include a USB enabled I/O interface that includes plural USB ports that may be used to couple a USB-enabled device. The I/O interface 140 can be used to couple a first device 142, a second device 144, and an $n^{th}$ device 146, or any combination thereof. Each device can include a device configuration descriptor, such as a USB configuration descriptor, and in one form, can include a test descriptor. For example, the first device 142 can include a first descriptor 150, a second descriptor 152, a test descriptor 154, or any combination thereof. According to one aspect, the device configuration descriptor 148 can include various types of information having various forms and types of data such as memory offsets, address locations, field names, descriptor sizes, descriptor values, test identifiers, test names, test name indexes, test values, test time-out values, or any combination thereof.

According to another aspect, the first device 142, the second device 144, and the nth device 146, or any combination thereof, can be used as a USB compliant device or component operable to communicate with the information handling system 100 using a USB communication protocol and device configuration descriptors. For example, a USB-enabled device can include an application program interface (API) or driver that uses USB communication and control that can be established between the information handling system 100 and a device such as the first device 142. Examples of USB-enabled devices include keyboards, mouse devices, wireless communication devices, storage devices, cameras, printers, network hubs, pointing devices, biometric fingerprint reading devices, or any combination thereof.

During operation, the information handling system 100 can detect one or more device coupled to the I/O interface 140. For example, the information handling system 100 can perform a communication bus scan of the I/O interface 140 to detect the first device 142, the second device 144, and up to the $n^{th}$ device 146, and can be the same or different types. Upon detecting a device, such as the first device 142, the device configuration descriptor 148 can be communicated to the information handling system 100. The information handling system 100 can process the device configuration descriptor 148 and operating characteristics for the first device 142 can be determined. For example, the information handling system 100 can determine a device identifier, device type, vendor information, and other device descriptive information for the first device 142. The information handling system 100 can employ a specific driver for the first device 142. According to one aspect, the information handling system 100 can also process the device configuration descriptor 148 to determine if the test descriptor 154 is present. If a test descriptor 154 is present, the information handling system 100 can parse the test descriptor 154 and the device configuration descriptor 148, and initiate a test based on test information stored in association the test descriptor 154. In this manner, the first device 142 can provide device specified test information that can be used by the information handling system 100 in support of, or in place of, one or more tests that may be provided by the information handling system 100 to test the first device 142.

In one embodiment, the information handling system 100 can detect the first device 142, and can further initiate a standard command, such as a USB command, to obtain the device configuration descriptor 148. For example, the information handling system 100 can obtain the device configuration descriptor 148, and can search the device configuration descriptor 148 to detect the test descriptor 154. In one form, if the first device 142 is provided as a USB-enabled device, the information handling system can search the device configuration descriptor using a "GetConfigurationDescriptor( )" command. The information handling system 100 can further search the device configuration descriptor 148 including the test descriptor 154 to determine a "bDescriptorType" value of "0xFF" and a "dSignature" value of "BIST" or other type of self test signature. In various forms, other valid values may also be realized. If the values are valid, the information handling system 100 can continue proceed by initiating a test most for the self-test test provided by the first device 142. If one or more values are invalid, the information handling system 100 can perform tests initiated by the information handling system 100 to test the first device 142 as desired.

In one embodiment, if test information to initiate a self-test is available by the first device 142, the information handling system 100 can set the first device 142 into a test mode using an enable test mode command. Upon setting the first device 142 in test mode, the information handling system 100 can parse the device configuration descriptor 148 and obtain the test information provided in association with the test descriptor 154. For example, the information handling system 100 can obtain test information from various fields within the test descriptor 154. The test information can include test identifiers, test names, test name indexes, test time-out values, a total number of tests to perform, or other suitable types of test information, or any combination thereof.

The information handling system 100 can read the first test and associated value and initiate the test using the I/O interface 140. For example, the information handling system 100 can initiate a flash memory test, interrupt controller test, memory test, register test, or any other type of test provided within the test information for testing the first device 142. During testing, the information handling system 100 can poll the first device 142 periodically perform a GetTestStatus command (e.g. every 200-300 milliseconds) to determine a test status for the first device 142. If the first device 142 responds having a specific bit set to a specific value, (e.g. bit seven (7) set to zero (0)), the test is complete. In other embodiment, if a specific bit is set to another value (e.g. bit seven (7) set to (1)), the test may not be complete. Additionally, if the test is complete, the first device 142 can return a value of '0x0564' (e.g. bProgress bit 7 clear, bits 0-6 set to 100 decimal, and bReturnCode set to 5 for test passed). If the test fails the first device 142 can return with bProgress bit 7 clear, and the bReturnCode should set to a valid error code. For example, if the error was due to a host error, the first device 142 should return a value of '3' in bReturnCode. In other forms, the first device 142 can return a vendor specific error code that can range from ten to ninety-nine (e.g. 10-99).

If the test failed, the information handling system 100 can output an error message. If the test passes, the information handling system 100 can perform additional tests as desired. Upon performing any additional tests, the information handling system 100 can disable the test mode. The first device 142 can then be reinitialized, if desired. The first device 142 can also be responsive to standard commands, such as standard USB commands, as desired. Through providing a device provided self-test operating environment, the information handling system 100 need not maintain or commit local resources, such as unique memory stacks and associated programming, to test a device connected to the I/O interface 140. For example, for USB-enabled devices, third party USB stacks need not be provided by the information handling system 100 before the information handling system 100 can an attempt to communicate with the USB enabled device under an operating system such as DOS, Unix, Linux, etc.

Figure 2:
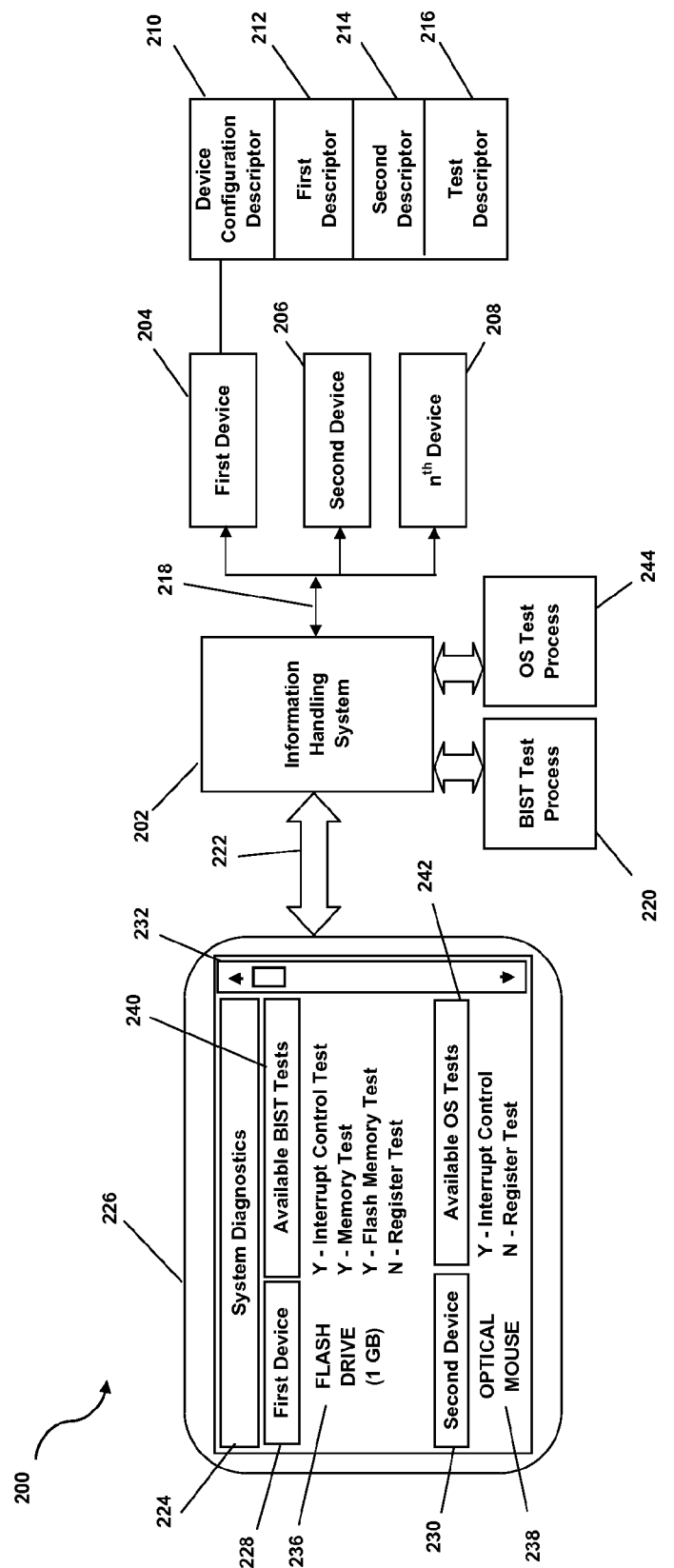
FIG. 2 illustrates a block diagram of a diagnostic test system according to another aspect of the disclosure.

FIG. 2 illustrates diagnostic test system, generally depicted at 200, according to an aspect of the disclosure. The system 200 can be employed, in whole or in part, by the information handling system 100 illustrated in FIG. 1 or other types of information handling systems that can benefit from one or more features or functions of the diagnostic test system 200. The diagnostic test system 200 includes an information handling system 202 operable to be coupled to a first device 204, a second device 206, an $n^{th}$ device 208, or any combination thereof, and can be the same or a different type of device. According to one aspect, the first device 204 can include the first device 146 described in FIG. 1 above. The first device 204 can also include a device configuration descriptor 210 having a first descriptor 212, a second descriptor 214, a test descriptor 216, or any combination thereof. The first device 204, second device 206, $n^{th}$ device 208, or any combination thereof, can include a device configuration descriptor that can be used by the information handling system 202. The information handling system 202 can further include a communication bus 218 to connect one or more of the first device 204, the second device 206, and the nth device 208. In one form, the communication bus 218 can include a USB communication bus operable to connect a plurality of USB-enabled devices to the information handling system 202.

According to one aspect, the information handling system 202 can access a built-in-self-test (BIST) test process 220 operable to identify a self-test to test a specific device when connected to the information handling system 202 via the communication bus 218. The BIST test process 220 can be provided as a software module, application, process, or other form of encoded logic that can be used by the information handling system 202, independent, or with, the diagnostic test system 200.

In one form, the diagnostic test system 200 can also include a user interface I/O channel 222 operable to present a system diagnostics user interface 224 within a display 226, such as a flat panel display or other display device operably coupled to the information handling system 202. The user interface I/O channel 222 can also be used to receive inputs from a user of the information handling system 202 as a user interacts with the system diagnostics user interface 224. The system diagnostics user interface 224 can also include a first device display element 228, a second device display element 230, and other display elements and associated information (not illustrated) that can be accessed using a scroll bar 232. The system diagnostics user interface 224 can also include a first device name 236 associated with the first device 204 coupled to the communication bus 218. Additionally, the system diagnostics user interface 224 can also include a second device name 238 associated with the second device 206 coupled to the communication bus 218. The first device name 236 also includes a list of available BIST tests 240 to test the first device 204. The second device name 238 also includes a list of available OS tests 242 to test the second device 206.

During operation, the system diagnostics user interface 224 can be presented within the display 226 in association with the information handling system 202 executing a system diagnostic program to test one or more devices connected to the communication bus 218 of the information handling system 100. For example, the system diagnostic program can access a device configuration descriptor for each device connected to the communication bus 218, and employ an appropriate test process to test the device based on the information provided in association with the device configuration descriptor. For example, the first device 204 can include the device configuration descriptor 210 including the test descriptor 216.

Upon the information handling system 202 detecting the test descriptor 216, the BIST test process 220 can be used to determine one or more self-tests available to test the first device 204. For example, the test descriptor 216 can include test information for a plurality of self-tests that may be used to test the first device 204. As such, a list including one or more self-tests can be determined by the BIST test process 220, and populated within the available BIST tests 240 portion of the system diagnostics interface 224 for the first device 204. For example, the first device 204 can be a flash drive and that includes a test descriptor. As such, the BIST test process 220 can determine the device name, or "Flash Drive (1 GB)," for the fist device 204. Additionally, the BIST test process 220 can determine self-tests that can be used for testing the first device 204. For example, the BIST test process 220 can determine a self-test such as an interrupt control test, a memory test, a flash memory test, and a register test. Other tests may also be employed as desired. The available self-tests can be populated within the available BIST tests 240 portion of the system diagnostics user interface 224. A user can select one or more self-tests to use in association with testing the first device 204 as desired. As such, a test list for testing a device can be dynamically generated and presented to a user for selecting one or more self-tests for testing the first device 204 based on available self-tests provided by the first device 204.

According to another aspect, the information handling system 202 can include an optical mouse coupled as the second device 206. In one form, the second device 206 may not include a test descriptor. The information handling system 202 can determine a device name, such as "Optical Mouse," provided in association with a device configuration descriptor for the second device 206. As such, an OS test process 244 can be accessed to determine one or more OS tests that may be available for testing the second device 206. For example, an OS test can be employed using a vendor-defined OS test stack that may have been previously generated for the information handling system 100 for testing an optical mouse. As such, the OS test process 244 can determine the OS test stack used in association with the optical mouse, and present a list of one or more available OS tests 242 for testing the second device 206 including an optical mouse. The one or more available OS tests 242 can be presented within the system diagnostics user interface 224 and, a user can enable or disable one or more of the available OS tests 242 as desired. In this manner, a diagnostic test system 200 can be used that allows a user to select one or more tests for testing the first device 202 using available BIST tests 240 provided in association with the test descriptor 216. Additionally, a diagnostic test system 200 can be also be used to allow a user to select one or more tests for testing the second device 206 using available OS tests 242. The diagnostic system 200 can then test each device using a selected test one or more times as desired.

Figure 3:
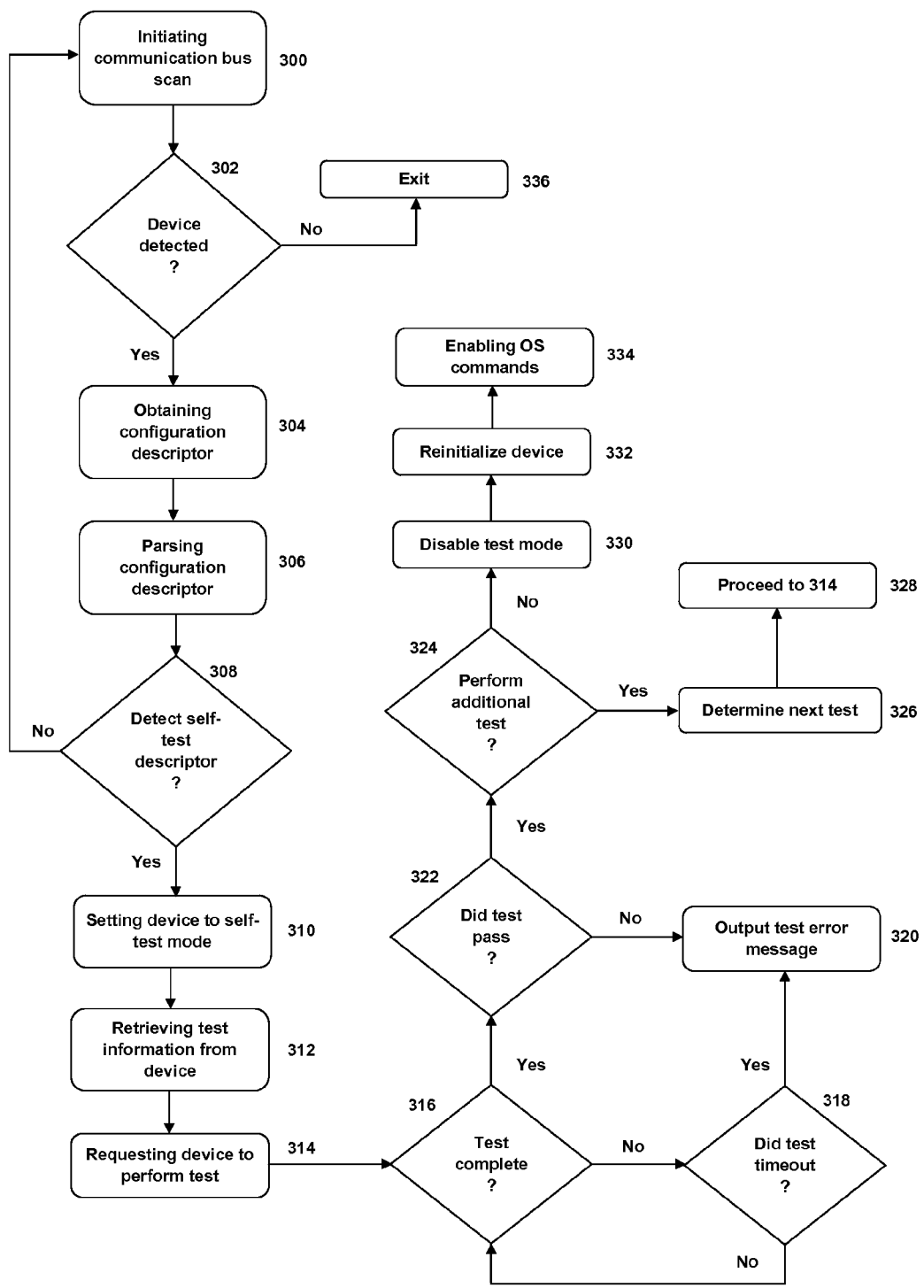
FIG. 3 illustrates a method of testing a device operable to be coupled to a communication bus of an information handling system according to a further aspect of the disclosure.

FIG. 3 illustrates a method of testing a device operable to be coupled to a communication bus of an information handling system according to one aspect of the disclosure. The method of FIG. 3 can be employed in whole or in part by the information handling system 100 depicted in FIG. 1, the system 200 illustrated in FIG. 2, or other types of information handling systems, devices, or components operable to employ the method of FIG. 3. Additionally, the method can be embodied in various types of encoded logic or computer readable mediums such as software, firmware, hardware, or other forms of encoded logic or computer readable mediums that can provide all or portions of the method of FIG. 3.

The method begins generally at block 300 upon initiating a scan of a communication bus to detect a device. For example, a device can be connected to a communication bus of an information handling system. A bus controller or other form of controller can access a communication bus to detect one or more devices that can be in association with the information handling system. In one form, the communication bus can include a USB-enabled communication bus operably associated with an information handling system. A USB controller or interface can perform a scan on an associated USB bus to detect one or more USB-enabled devices coupled to the USB-enabled communication bus. In one form, a scan can be initiated in association with initializing an information handling system, or in other forms, a scan may be initiated by a system diagnostic program or process operably associated with the information handling system. In another other embodiment, block 300 can be modified to allow a device connected to an information handling system to initiate a request for a self-test as desired.

Upon initiating a communication bus scan or request for a self-test, the method proceeds to decision block 302 and determines if a device may be connected to the communication bus. If a device is not detected, the method proceeds to block 336 and exits. If at decision block 302, a device is detected, the method proceeds to block 304 and obtains a device configuration descriptor from the detected device. For example, a device configuration descriptor can be stored within a memory device of a device and can be retrieved by an information handling system during a communication bus scan. In one form, a USB-enabled device can include a device configuration descriptor that can be obtained using a USB command such as "GetConfigurationDescriptor( )." A connected device can provide a response to the command that includes the device configuration descriptor. Upon obtaining the device configuration descriptor, the method proceeds to block 306 and the device configuration descriptor can be parsed to determine if a self-test descriptor may be present within the device configuration descriptor. If at decision block 308, a self-test descriptor is not detected, the method proceeds to block 300 and repeats as desired. In one form, if at decision block 308 a self-test descriptor is detected, the method can proceed to block 310 and the device can be set into a self-test mode for initiating testing of the device. For example, an information handling system can communicate a command to place the device into a test mode for testing the device. The method then proceeds to block 312 and test information can be retrieved from the device or the device configuration descriptor. For example, the device configuration descriptor can include a test descriptor that includes test information such as test names, test identifiers, test time-out values, test name indexes, total number of tests, test result values, or various other types of test information that can be provided by the device and used during a test mode. In one form, a test descriptor can be stored at the end of a device configuration descriptor and included in a total length field in the device configuration descriptor. In one embodiment, the test information can be stored within a memory device of the device and can be requested by the information handling system upon detecting that test information can be provided by the device.

Upon retrieving the test information, the method proceeds to block 314 and requests the device to perform a test provided within the test information. For example, the device can request a "Flash Memory Test," and the information handling system can send a request to the device to perform the "Flash Memory Test." At decision block 316, the method determines if the test is complete. For example, the information handling system can communicate a status request command to determine if the test may be complete. If the test has not completed, the method proceeds to decision block 318 and determines if the test has timed out. For example, a test timeout value, such as four hundred (400) milliseconds, five thousand (5000) milliseconds, etc. for a specific test can be provided. If the test timeout value has been exceeded at decision block 318, the method proceeds to block 320 and an error message can be provided. For example, the device can communicate an error message that can be displayed by the information handling system. If at decision block 318 the test timeout value has not been exceeded, the method proceeds to decision block 316 and repeats.

If at decision block 316, the test has completed, the method proceeds to decision block 322 and determines if the test passed. If the test did not pass, the method proceeds to block 320 and an error message can be output to indicate that the test failed. If at decision block 322, the test passed, the method proceeds to decision block 324 and determines if an additional test should be performed. If an additional test should be performed, the method proceeds to block 326 and determines the next test to perform. The method then proceeds to block 328, and block 314, and repeats with testing the device using the next test. If at decision block 324, no additional tests are to be performed, the method proceeds to block 330 and the test mode for the device is disabled. For example, if USB commands are employed, "SetConfiguration( )" command and a valid configuration value can be used to disable the test mode. In one embodiment, the method can proceed with reinitializing the device if desired. The method then proceeds to block 334 and OS commands associated with the operating system of the information handling system can be used to access one or more functions or features of the device. In one embodiment, the method of FIG. 3 can be used in association with diagnostic tests that can be performed, prior to, or in addition to, self-tests that may be communicated from the device to the information handling system. In this manner, a device, such as a USB-enabled device, can be coupled to a USB communication port of an information handling system, and a built in self-test can be used to test the USB-enabled device. Additionally, various other diagnostics tests can also be performed as desired.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A device comprising:
   a communication interface configured to be coupled to a communication bus of an information handling system;
   a configuration descriptor stored within a memory operable to be accessed during a communication bus scan; and
   a self-test descriptor associated with the configuration descriptor, the self-test descriptor configured to be read in association with the configuration descriptor, and configured to enable the information handling system to test a portion of the device using test information associated with the self-test descriptor.

2. The device of claim 1, further comprising a test mode operable to be activated in response to a detection of self-test descriptor.

3. The device of claim 2, wherein the test information is stored within the memory and operable to be used in association with the test mode.

4. The device of claim 3, wherein the test information includes a test name.

5. The device of claim 3, wherein the test information includes a test time-out value.

6. The device of claim 1, wherein the configuration descriptor includes the self-test descriptor.

7. A method of testing an electronic device, the method comprising:
   accessing a configuration descriptor of a first device coupled to a communication bus of an information handling system;
   detecting a self-test descriptor associated with the configuration descriptor;
   parsing the self-test descriptor and the configuration descriptor; and
   testing a portion of the first device using test information associated with the self-test descriptor after parsing the self-test descriptor and the configuration descriptor.

8. The method of claim 7, further comprising:
reading the test information from the configuration descriptor;
determining a test identifier within the test information; and
enabling a test mode to test the portion of the first device using the test identifier.

9. The method of claim 8, further comprising:
determining a time-out value associated with the test identifier; and
outputting an error message in response to exceeding a time-out value.

10. The method of claim 7, further comprising:
receiving a request to enable a test mode;
enabling the test mode;
determining when the testing a portion of the first device is complete; and
disabling the test mode.

11. The method of claim 7, further comprising:
reading the test information;
generating a test list based on reading the test information; and
using the test information within the test list to initiate the testing.

12. The method of claim 7, further comprising:
executing a system diagnostic process using the information handling system;
initiating the scanning of the communication bus scan using the system diagnostic process;
detecting the first device;
detecting a second device;
testing the first device using the test information;
testing the second device using a system diagnostic test; and
testing the first device using the system diagnostic test.

13. The method of claim 7, further comprising:
testing the first device using a first test identifier associated with a first test;
determining if the first device passed the first test;
determining a second test identifier associated with a second test;
testing the first device using the second test identifier; and
determining if the first device passed the second test.

14. The method of claim 7, further comprising:
determining when a test is not available for testing the first device;
disabling a test mode; and
enabling operating system commands in association with the first device.

15. An information handling system comprising:
a communication bus configured to couple the information handling system to a bus-enabled device;
a processor in communication with the communication bus, the processor configured to initiate a scan of the communication bus, to detect the bus-enabled device, to send a request to read a configuration descriptor of the bus-enabled device, to parse the configuration descriptor and a self-test descriptor associated with the configuration descriptor; and
a test mode output in communication with the communication bus, the test mode output configured to be coupled to the bus-enabled device in response to parsing the configuration descriptor and the self-test descriptor, and further configured to test a portion of the bus-enabled device using information associated with the self test descriptor.

16. The information handling system of claim 15, further comprising a diagnostic test system.

17. The information handling system of claim 16, wherein the processor is operable to build a test list using the test information, the test list including a test identifier.

18. The information handling system of claim 17, wherein the processor is further operable to activate a test using the test identifier provided within the test list.

19. The information handling system of claim 18, further comprising:
a display operably coupled to the processor to output the test list in association with a reference to the bus-enabled device; and
a selector operable to enable a user to select the test identifier displayed within the test list;
wherein the processor is further operable to initiate a testing of the bus-enabled device in response to a user selecting the test identifier.

* * * * *